United States Patent [19]
Foerstner et al.

[11] Patent Number: 6,013,933
[45] Date of Patent: Jan. 11, 2000

[54] SEMICONDUCTOR STRUCTURE HAVING A MONOCRYSTALLINE MEMBER OVERLYING A CAVITY IN A SEMICONDUCTOR SUBSTRATE AND PROCESS THEREFOR

[75] Inventors: Juergen August Foerstner, Mesa; Henry Guenther Hughes; Amir Raza Mirza, both of Scottsdale, all of Ariz.

[73] Assignee: Motorola, Inc., Schaumburg, Ill.

[21] Appl. No.: 08/866,588

[22] Filed: May 30, 1997

[51] Int. Cl.[7] .................................................. H01L 29/82
[52] U.S. Cl. ............................................. 257/415; 257/417
[58] Field of Search ...................................... 257/415, 417

[56] References Cited

U.S. PATENT DOCUMENTS 5,058,856  10/1991  Gordon et al. .
5,287,082   2/1994  Arney et al. ............................ 338/307
5,578,755  11/1996  Offenberg ............................ 73/514.32

OTHER PUBLICATIONS

The 7th International Conference on Solid–State Sensors and Actuators; Jun. 1993, Yokohama, Japan; *Digest of Technical Papers,* "Application of Porour Silicon as a Sacrifical Layer", W.Lan P. Steiner, A. Richter, K. Marusczyk, G. Weimann and H. Sandmaier; pp. 202–203.

EDP; *Semiconductor Sensors;* John Wiley & Sons, Inc. "The controlled etching of silicon in catalyzed ethylenediamine–pyrocatechol–water solutions", A. Reisman,M. Berkenblit, S.A., Chan, F.B. Kaufman and D.C.Green, pp. 46–47.

*Sensor Technology and Devices;* 1994 Artech House, Inc.; "Bulk Micromachining Technology", Lj. Ristic, H. Hughes, F. Shemansky, pp. 49–66.

*Primary Examiner*—Stephen D. Meier
*Attorney, Agent, or Firm*—Rennie W. Dover; Daniel R. Collopy

[57] ABSTRACT

A process for forming a sensor (10) such as an accelerometer includes the steps of forming an epitaxial layer (14) on a semiconductor substrate (12), patterning a portion of the epitaxial layer to provide a monocrystalline finger (20,22), wherein the finger has a height (43) at least twice its width (44), and forming a cavity (40) under at least a portion of the finger to expose a bottom surface (38) of the finger using an etchant with an etch selectivity for the semiconductor substrate relative to the epitaxial layer of greater than about 10:1. The distance (42) from the bottom of the cavity to the bottom surface of the member is greater than about 5 microns. The accelerometer is useful for lateral acceleration sensing and is built in bulk silicon at the surface of the substrate.

5 Claims, 5 Drawing Sheets

SEMICONDUCTOR STRUCTURE HAVING A MONOCRYSTALLINE MEMBER OVERLYING A CAVITY IN A SEMICONDUCTOR SUBSTRATE AND PROCESS THEREFOR

BACKGROUND OF THE INVENTION

The present invention relates, in general, to semiconductor structures and, more particularly, to a semiconductor structure having a monocrystalline member overlying a cavity in a semiconductor substrate and a process therefor.

Sensor devices, and in particular accelerometers, often use a microstructure beam or other element as a part of the sensor. In the case of an accelerometer, the microstructure will include a movable beam or other mass disposed on a semiconductor chip that moves in response to external acceleration forces. This movement is converted by electronics either on the chip or on a related control die into electrical signals corresponding to the magnitude and direction of the acceleration. The sensor chip is typically mounted to a printed circuit board (PCB), such as with surface mount technology.

Some prior accelerometers measure acceleration in a direction perpendicular to the chip's surface (i.e. a z-axis). However, for some acceleration measurement applications, such as lateral acceleration measurement for air bag deployment in an automobile, such z-axis sensor chips must be mounted vertically relative to the PCB using a bracket or the like. This type of mounting, however, has several disadvantages. First, the bracket increases the degree of PCB-to-PCB spacing required and is expensive to provide with the chip. Also, such a sensor chip suffers from low sensitivity (i.e. is not suitable for low-g acceleration applications) and from a fairly low signal-to-noise ratio.

Further, such prior accelerometers use a capacitive plate that is parallel to the chip's surface. Thus, when the surface area of the plate is increased, such as to increase sensitivity, there is a corresponding, undesirable increase in parasitic capacitance between the plate and the chip's surface. Also, such increased surface area requires more of the chip's available surface area.

Another disadvantage of some current accelerometers is the use of polysilicon in the sensing elements. Polysilicon is susceptible to cracking and residual stresses that can negatively impact the performance of the sensor.

Accordingly, it would be desirable to have an accelerometer able to measure lateral acceleration without the need for vertical mounting on a PCB using a bracket and also suitable for high or low-g applications with an improved signal-to-noise ratio. It also would be desirable to have an accelerometer formed using materials more stable than polysilicon and to be able to increase the size of a capacitive plate in an accelerometer to improve sensitivity without significantly increasing parasitic capacitance.

DETAILED DESCRIPTION OF THE DRAWINGS

Figure 1:
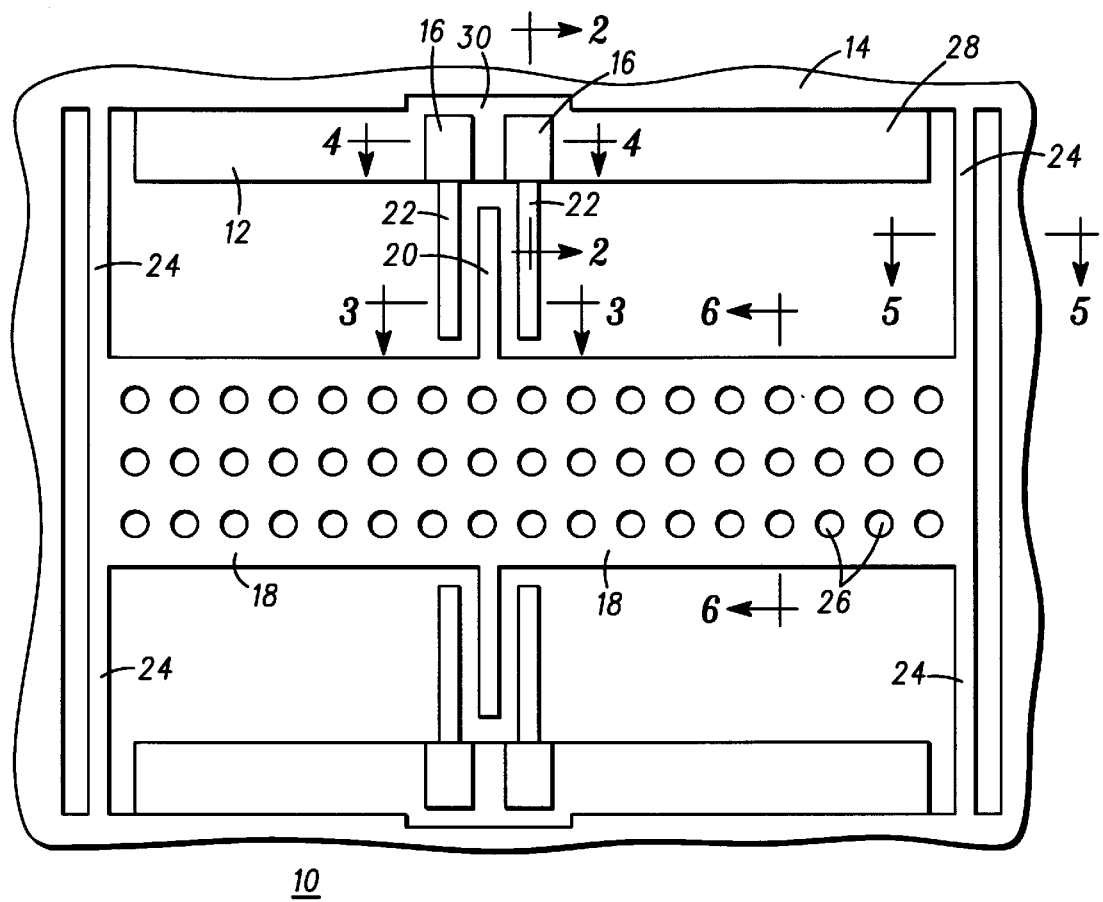
FIG. 1 is a top, plan view of an accelerometer according to one embodiment of the present invention.

FIG. 1 is a top, plan view of an accelerometer or semiconductor structure 10 according to one embodiment of the present invention. Although an accelerometer is shown here, it should be appreciated that the present invention is generally applicable to semiconductor structures or for many types of sensors including chemical sensors and further for even other types of semiconductor devices utilizing a monocrystalline or bulk semiconductor microstructure.

Accelerometer 10 has a movable seismic mass 18 that moves in response to acceleration forces. A movable member or finger or beam 20 is connected to mass 10 and moves therewith between two fixed or stationary members or fingers 22 to provide a variable, differential capacitance that varies in response to acceleration. Seismic mass 18 moves laterally with respect to the surface of a semiconductor substrate 12 and is connected to the major portion of a monocrystalline semiconductor or epitaxial layer 14 by springs 24. Members 20 and 22, along with springs 24, are formed from portions of originally-formed semiconductor layer 14 as described below. In this embodiment, semiconductor layer 14 is an epitaxial layer formed on substrate 12.

Semiconductor substrate 12 is, for example, silicon, but other semiconductor materials could be used in other embodiments. Stationary members 22 are connected or mounted to polycrystalline portions 16, which rest on a lower oxide layer 28. It should be noted that a refill oxide layer and a metal layer have not been shown in FIG. 1 for ease of illustration, but are shown in later figures. A trench 30 separates polycrystalline portions 16 from the major portion of epitaxial layer 14. Trench 30 and lower oxide layer 28 electrically isolate members 22, and electrical connection to members 22 is accomplished by contact from a patterned metal layer to polycrystalline portions 16 as described later.

Seismic mass 18 has many holes 26 therein, which are used during the release etch described below for forming a cavity under seismic mass 18 and members 20 and 22. Holes 26 permit an etching chemical to more readily form the cavity underneath. It should be appreciated that seismic mass 18 and members 20 and 22 are monocrystalline by virtue of the formation process to be described further below.

FIGS. 2–6 are cross-sectional views of the accelerometer of FIG. 1. Specifically with reference to FIG. 2, a refill oxide layer 32 is shown overlying epitaxial layer 14, polycrystalline portion 16, and part of stationary member 22. A metal layer 34 makes ohmic contact to polycrystalline portion 16, which is heavily-doped as a result of the processing described below. Metal layer 34 is used to provide an electrical signal path from electronic circuitry or a transistor circuit block (containing in a preferred embodiment complementary p and n-type transistors) formed on another portion of semiconductor substrate 12. A similar approach is used to provide electrical paths to other sensor members.

In this embodiment epitaxial layer 14 has been formed on substrate 12 and patterned to provide the sensor structure of FIG. 1 as discussed further below. A cavity 40 has been formed underlying member 22 and is characterized generally by a gap size 42 measured from a bottom surface 38 of member 22 to a cavity surface 36. Gap size 42 generally is greater than about 5 microns, and according to the process described below can be as large as about 50–100 microns. It should be recognized that such a large gap size 42 provides a significant improvement over prior sensors due to its reduction of parasitic capacitance between member 22 and substrate 12.

Figure 3:
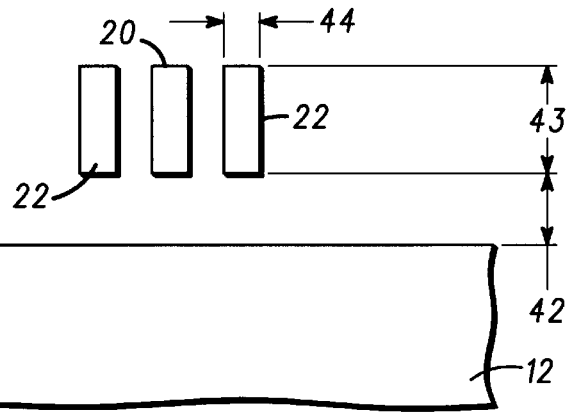

FIG. 3 illustrates a height 43 and a width 44 of member or finger 22 or 20. In general, height 43 is about 5–200 microns and more preferably about 5–25 microns. According to the method of the present invention described below, the height to width ratio of member 20 or 22 is generally greater than 2:1 (i.e. the height of a member is at least twice the width thereof). More specifically, the present invention can provide height:width ratios ranging up to about 100:1. In contrast, microstructures in prior sensors typically have a height:width ratio of 3:1 or less, due to the limitations of the formation process used with these prior sensors.

A significant advantage of the high height:width member ratio (i.e. aspect ratio) of the present invention is that, for example, in a capacitive sensor device, the size or capacitive surface area of a member used in a capacitor structure can be dramatically increased without a corresponding dramatic increase in parasitic capacitance. This is so because only the bottom surface 38 of a member is parallel to the cavity surface 36 of substrate 12 as the aspect ratio is increased. This is different from prior sensors having a capacitive plate with most of its extent parallel to the substrate surface, such as in a z-axis accelerometer. In such a case, increases in plate area increase the plate area that is parallel to the substrate, with a correspondingly large increase in parasitic capacitance.

Figure 4:
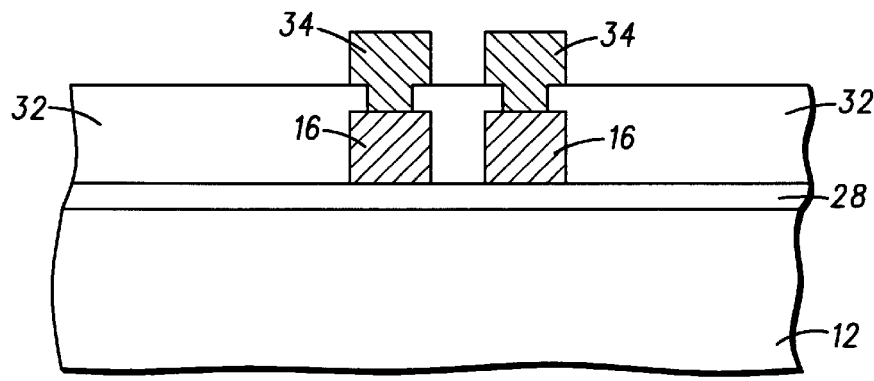

In FIG. 4 two distinct metal lines are shown as part of patterned metal layer 34. Each metal line is providing electrical connection to a stationary member 22 (see FIG. 2). Lower oxide layer 28 extends fully under both polycrystalline portions 16 and is directly on substrate 12.

Figure 5:
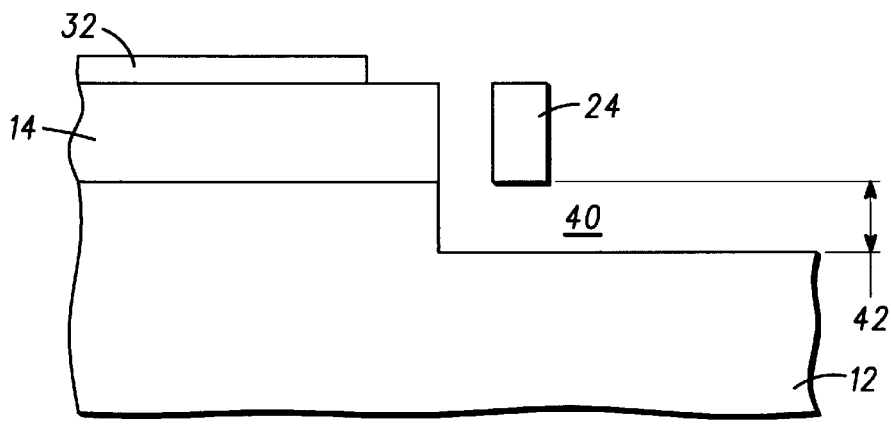

Referring to FIG. 5, spring 24 is shown proximate to epitaxial layer 14. Sufficient clearance between spring 24 and epitaxial layer 14 is provided for the full operating range of motion expected of seismic mass 18 (see FIG. 1). Refill oxide layer 32 extends over a portion of epitaxial layer 14.

It should be noted that cavity 40 will extend across a large portion of the surface of substrate 12, including under all springs 24, seismic mass 18, and members 20 and 22. Also, although only two sets of fixed and stationary members are shown on opposite sides of seismic mass 18, in a typical accelerometer, several such sets can be used on each side.

Figure 6:
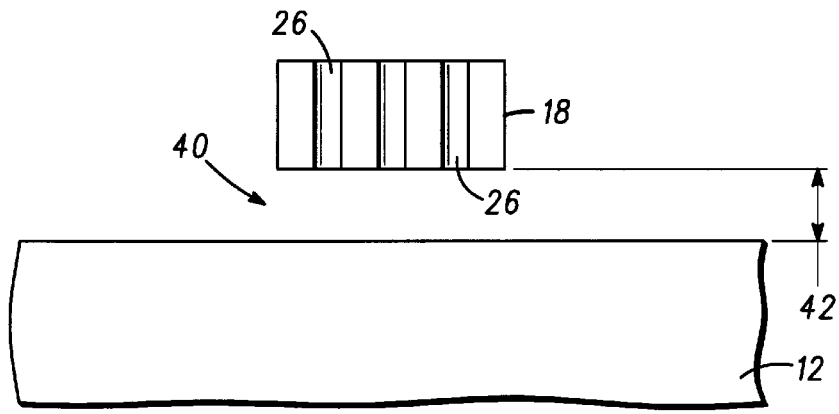
Figure 7:
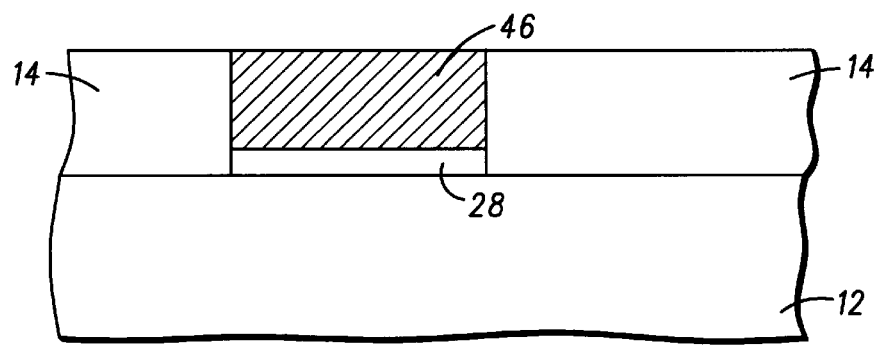
FIGS. 7–10 are cross-sectional views illustrating sequential steps in the formation of the accelerometer of FIG. 1.

FIG. 6 shows seismic mass 18 suspended over cavity 40. Holes 26 extend fully through seismic mass 18 for the release etch chemical to pass through as described below. During sensing, seismic mass 18 moves substantially parallel to substrate 12.

Figure 2:
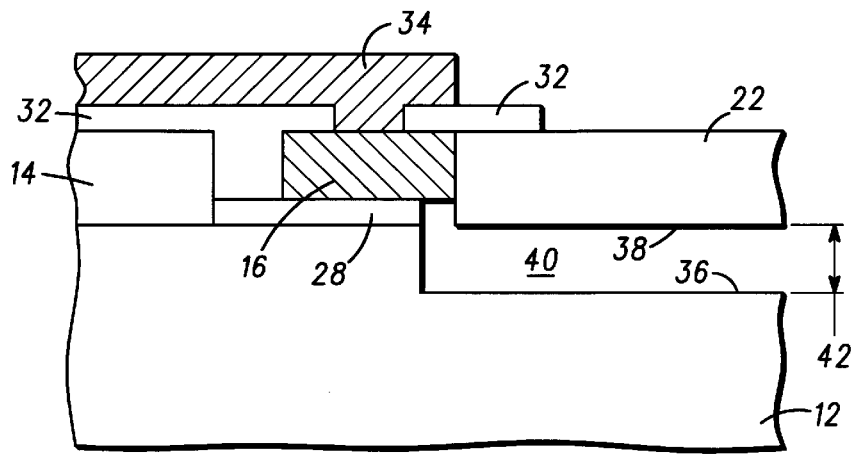
FIGS. 2–6 are cross-sectional views of the accelerometer of FIG. 1.

FIGS. 7–10 are cross-sectional views illustrating sequential steps in the formation of the accelerometer of FIG. 1 and more specifically corresponding to the final structure shown in the cross-sectional view of FIG. 2. Starting with FIG. 7, a semiconductor substrate 12 preferably of silicon with a <100> crystallographic orientation is selected. An oxide layer is formed on substrate 12, for example, by conventional thermal oxidation to a thickness of about 0.5–1 microns and then conventionally patterned to provide lower oxide layer 28. Next, a semiconductor layer 14, preferably an epitaxial layer, is formed on substrate 12 using, for example, a conventional, monocrystalline epitaxial layer formation process. The thickness of the formed epitaxial layer is about 5–200 microns, and more preferably about 5–25 microns, and generally corresponds to the final height 43 desired for members 20 and 22.

Those portions of the epitaxial layer that are formed over lower oxide layer 28 are formed as polycrystalline in nature, as is known, and thus provide a polycrystalline region 46 (which is later etched to provide polycrystalline portion 16).

In general, substrate 12 can be doped either as p or n-type. However, the doping type and concentration for both substrate 12 and epitaxial layer 14 depend in part on the particular cavity formation process to be used, as is discussed in greater detail below.

Figure 8:
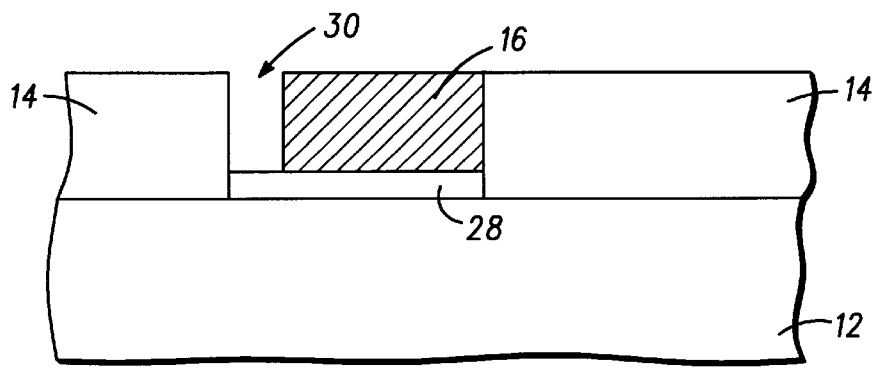

In FIG. 8, trench 30 is formed by, for example, a reactive ion etch (RIE). Also, preferably in the same etching step, but not shown in FIG. 8, all of the other structures shown in FIG. 1 including seismic mass 18, springs 24, and members 20 and 22 are patterned. It should be noted that the etch for trench 30 stops on oxide layer 28, but the etch for patterning the other sensor structures extends down to substrate 12. A timed etch is used to control the depth of the etch for these other structures. Trench 30 is, for example, about 1–2 microns wide.

Figure 9:
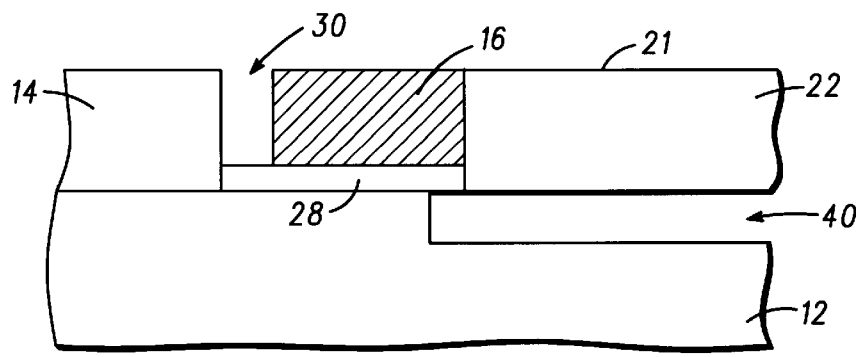

FIG. 9 illustrates the formation of cavity 40 under member 22. In general, cavity 40 is formed by an etch (sometimes referred to as a release etch) that removes sufficient material from substrate 12 to permit the free movement of the movable portions of the sensor. The etchant used for this release etching passes through holes 26 to improve uniformity of the etching. As discussed below, there are several processing options that can be used to form cavity 40. However, one of skill in the art will recognize that other conventional process alternatives not presented below could possibly be used to form cavity 40, if consistent with the sensor's structural characteristics described herein.

In general cavity 40 will be etched to a depth sufficient to provide a gap size 42 of greater than about 5 microns. Gap size 42 more typically ranges between about 1–50 microns, and more preferably is about 1–20 microns. Also, it should be noted that, according to a preferred approach, a top surface 21 of member 22 is directly exposed to the etchant used to form cavity 40. This is in contrast to some prior approaches in which a layer of non-monocrystalline material is formed on the member prior to release etching.

As set forth below, substrate 12 and epitaxial layer 14 are in general doped such that a high etch selectivity can be achieved. Also, in most cases below, the substrate and the semiconductor layer are doped to have an opposite conductivity type. The etch selectivity of the etchant used during release etching will in general have a selectivity for substrate 12 relative to epitaxial layer 14 of greater than about 10:1 and more preferably greater than about 50:1. Even greater selectivity is possible as discussed below.

This high etch selectivity is an important advantage over prior microstructure processes because is permits the formation of capacitive fingers of relatively large height and high aspect ratio. Such large height and high aspect ratio make possible a large signal-to-noise ratio and a larger capacitance for the sensor (so that lower acceleration forces can be measured).

Process Option 1: Selective Etch without Bias

In a first cavity etching approach, cavity 40 is formed by etching with an etchant formed by a mixture of nitric and hydrofluoric acid (HF) in water. Preferably, an organic acid such as acetic acid is also provided in the mixture. A preferred mixture ratio is about 8:3:1 of acetic acid:nitric acid:HF by volume. Such a preferred mixture is suitable for etching cavity 40 at, for example, a temperature of about 25 degrees Celsius (°C.) where the etch rate of silicon in the substrate is about 1 micron per minute.

The etchant can achieve a selectivity of about 100:1 for the substrate relative to the epitaxial layer. This selectivity is accomplished by doping substrate 12 to have a heavy dopant concentration (of either p or n-type) of preferably greater than about 1E18 atoms/cubic centimeter (atoms/cm$^3$). Semiconductor layer 14 is doped of an opposite conductivity type to that of substrate 12 to have a dopant concentration of preferably less than about 1E16 atoms/cm$^3$.

The above dopant configuration permits the etch selectivity described here. The doping of the substrate is preferably accomplished by starting with an intrinsically doped material from wafer fabrication. The doping of the semiconductor layer is, for example, done by intrinsic in-situ doping during epitaxial layer formation. However, doping of the substrate and the epitaxial layer also can be done in other conventional ways.

Process Option 2: Electrochemical Etch

For this process option, substrate 12 is heavily doped to have a dopant concentration greater than about 1E18 atoms/cm$^3$ and can be doped either p or n-type. Epitaxial layer 14 can be doped either p or n-type, even if the dopant conductivity type is the same as used to dope substrate 12, but the dopant concentration should be less than about 1E16 atoms/cm$^3$. A suitable etchant is HF, and substrate 12 is electrically biased, for example to about 1–10 volts (V) relative to the etchant solution potential during etching. The HF is, for example, about 5% HF by weight in water, and the etching can be done at about 25° C.

Although HF is described here, other etchants may also be used for this electrochemical etch. For this process option, etch selectivity generally is greater than about 300:1 and typically is expected to be about 300:1 to 1,000:1 (substrate:epitaxial layer). Also, biasing of the substrate can be done by a conventional back-side wafer contact.

Process Option 3: TMAH Etch

Here, substrate 12 is doped either heavily or lightly with a p-type dopant. It should be noted that a p-type dopant is preferably used for the doping of substrate 12 in this process option if the sensor will be integrated onto a chip with complementary metal oxide semiconductor (CMOS) devices (discussed below in greater detail), but that an n-type dopant otherwise could be used. Epitaxial layer 14 is doped to have a dopant concentration less than about 1E16 atoms/cm$^3$ using an n-type dopant. The microstructure including seismic mass 18 and all members 20 and 22 is electrically biased during etching relative to the etchant solution by, for example, about 1–10 V. The etchant is tetramethylammonium hydroxide (TMAH), for example 20% by weight in water, and etching is done during bias at a temperature of, for example, about 90° C. The etch selectivity in general is greater than about 300:1 and typically is expected to be about 300:1 to 1,000:1. In general, during this etch, those materials that are electrically biased as described above will substantially remain un-etched.

The biasing of the patterned microstructure can be accomplished in one approach by performing a blanket silicide and metal deposition that covers all parts of the microstructure. The bias is then applied to the blanket layer during etching. The silicide and metal layers are removed after the release etching.

Process Option 4: Porous Silicon Etch

In this process option, a porous silicon layer is formed in substrate 12, oxidized, and then etched to provide cavity 40. Porous silicon formation is known in the art and is described generally in "Application of Porous Silicon as a Sacrificial Layer," by W. Lang et al., 7th International Conference on Solid-State Sensors and Actuators, Digest of Technical Papers, Transducers, Jun. 7–10, 1993, Pacifico, Yokohoma, Japan, pp. 202–203, which is hereby incorporated by reference in full.

Figure 11:
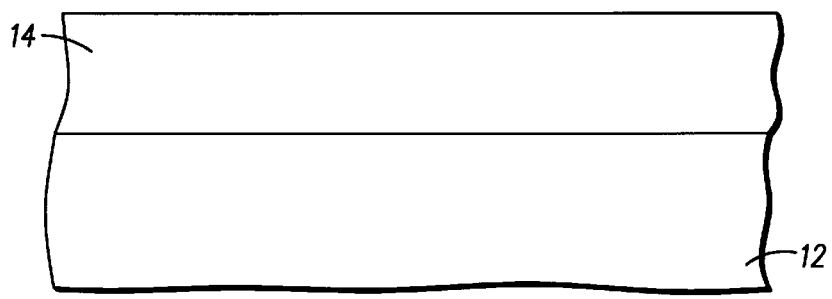
FIGS. 11–13 are cross-sectional views illustrating sequential steps in the formation of the accelerometer of FIG. 1 according to an alternate embodiment using porous silicon formation.
Figure 12:
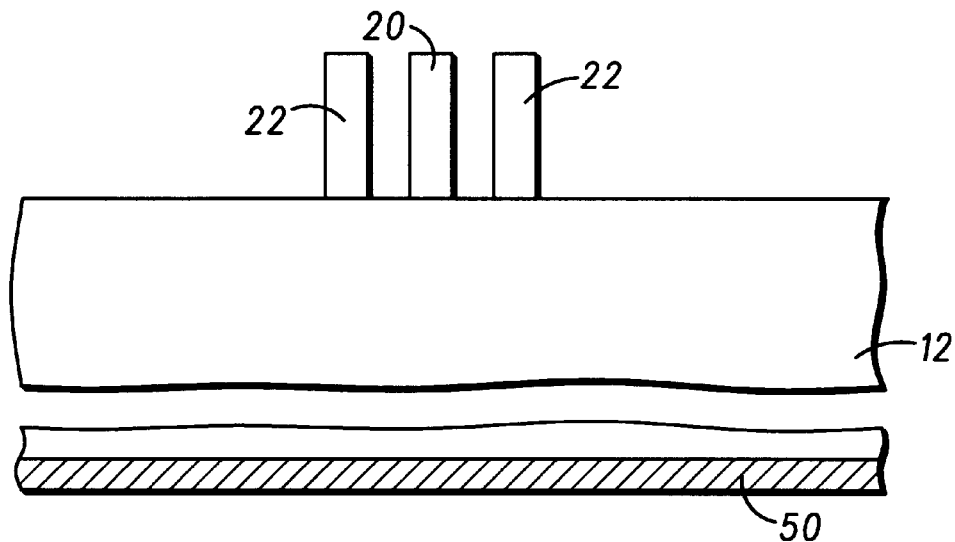
Figure 13:
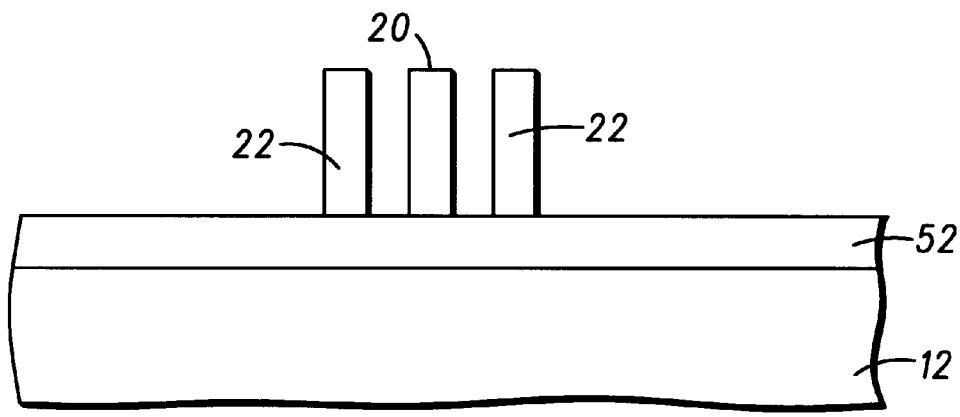

FIGS. 11–13 are cross-sectional views illustrating sequential steps in the formation of the accelerometer of FIG. 1 according this porous silicon process option. These figures more specifically correspond to the final structure shown in FIG. 3. In FIG. 11, epitaxial layer 14 has been formed on substrate 12. However, in this process option, no lower oxide layer 28 is present at this point in processing as was the case above. As a result, epitaxial layer 14 (and the final sensor structure in this embodiment) does not contain any polycrystalline regions or portions. Thus, polycrystalline portions 16 of FIG. 1 will be monocrystalline portions in this embodiment.

In FIG. 12, members 20 and 22 and the rest of the microstructure have been patterned, for example, by RIE. Also, in preparation for porous silicon formation, a backside contact such as tungsten silicide is formed on substrate 12.

Referring to FIG. 13, a porous silicon layer 52 is formed using a conventional porous silicon technique. Porous silicon layer 52 has a thickness of, for example, about 5 microns. It should be noted that this thickness will later correspond to the final thickness of lower oxide layer 28, as seen below. Porous silicon layer 52 is formed, for example, by electrically biasing substrate 12 relative to an etchant solution by about 1–10 V using backside contact 50. The etchant solution forms porous silicon layer 52 by chemically reacting with the surface of substrate 12 and can be a 5% by weight HF solution used at a temperature of about 25° C. It also should be noted that backside contact 50 is also a useful approach for biasing according to other process options herein.

After porous silicon layer 52 is formed as above, it is thermally oxidized, for example, in an oxygen atmosphere at about 1,000° C. for about 2 hours. The result is a substantial conversion of layer 52 into a silicon oxide layer because oxygen diffuses rapidly throughout the porous silicon.

To form cavity 40, the silicon oxide layer is etched using, for example, an HF solution. The etch selectivity of the etchant for the oxidized porous silicon relative to the semiconductor members 20 and 22 or substrate 12 is roughly greater than about 10,000:1 such that substantially only the oxide layer 52 is etched.

In general, during the release etch, all exposed portions of oxide layer 52 will be removed. It should be noted that after the release etch, those portions of oxide layer 52 that were not removed will provide the equivalent oxide layer to lower oxide layer 28 of FIG. 1 with only minor differences as will be recognized by one of skill in the art. For example, the height of lower oxide layer 28 relative to cavity 40 will be shifted downward slightly from that shown in FIG. 1.

Process Option 5: Selective Anisotropic Etch without Bias

In process option 5, substrate 12 is lightly doped to either p or n-type to have a dopant concentration of less than about 1E16 atoms/cm$^3$. Epitaxial layer 14 is heavily doped of an opposite conductivity type to a dopant concentration of greater than about 1E18 atoms/cm$^3$. The etchants that may be used include a conventional TMAH solution or a conventional ethylenediamine and pyrocatechol solution (EDP solution). The TMAH solution is, for example, about 20% by weight of TMAH in water, and the etching can be done at about 90° C. EDP solutions are described in general in Semiconductor Sensors, S. M. Sze, editor, p. 46 (which is part of chapter 2.4, Bulk Micromachining; other EDP references are cited on p. 88), John Wiley & Sons, New York, and TMAH solutions are described more in "Bulk Micromachining Technology," chapter 3, L. Ristic et al., in Sensor Technology and Devices, L. Ristic, editor, Artech House, Boston, 1994, pp. 49 et seq., which are each hereby incorporated by reference in full. Also, it is believed that ethylenediamine or pyrocatechol possibly can be used separately in some cases. The etch selectivity for the TMAH or EDP solution is greater than about 100:1.

Because epitaxial layer 14 is heavily doped here, if a transistor circuit block is to be integrated onto the same semiconductor substrate 12, then it is necessary to use a conventional selective epitaxial deposition process to form a lightly-doped epitaxial layer on heavily-doped epitaxial layer 14. Then, transistors can be formed in the lightly-doped selective epitaxial layer. The selective epitaxial layer would not be formed in the sensor region of the chip. Also, the selective epitaxial layer would preferably be formed after formation and planarization of the refill oxide layer 32.

Final Processing after Cavity Formation

Figure 10:
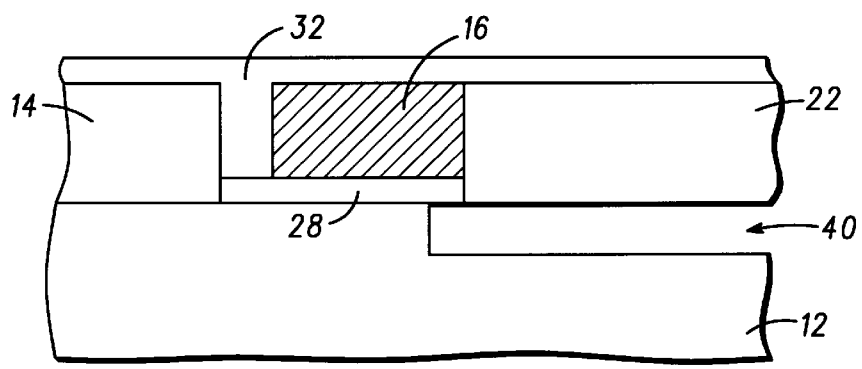

As shown in FIG. 10, after cavity 40 has been formed, refill oxide layer 32 is formed, for example, as a chemical vapor deposition (CVD) deposited silicon oxide layer that blankets the exposed surface on substrate 12. The thickness of refill oxide layer 32 is, for example, about 1–10 microns.

Following the formation of cavity 40 using, for example, one of the five process options presented above, the microstructure components of the sensor should be doped to have a higher dopant concentration of greater than about 1E18 atoms/cm$^3$ so that electrical conductivity of the sensor components is relatively high (i.e. electrical resistance is low). Low electrical resistance is desired so that the fingers act as efficient electrodes. This, in one approach, can be accomplished by providing the appropriate type dopant, for example phosphorous, in the refill oxide layer during its formation, such as by forming a phosphorous silicate glass (PSG). In this case, phosphorous dopant will diffuse from refill oxide layer 32 into and throughout the sensor components so that they have a relatively high dopant concentration. This diffusion will occur prior to the later removal of a portion of refill oxide layer 32 during the sacrificial etch due to the elevated temperature of other processing steps. Also, it should be noted that other doping methods such as ion implant or gas-phase doping with phosphine gas can also be used instead of the above approach.

Next, refill oxide layer 32 is planarized using a conventional technique in preparation for the formation of transistors in a transistor circuit block (not shown) to be formed on another portion of substrate 12.

The transistor circuit block in general contains electronic circuitry that is electrically connected using an appropriate metal line trace pattern in metal layer 34. A significant advantage of the present invention is that a sensor such as that described above can be integrated with transistors or other passive devices of the circuit block. The circuit block may contain both n and p-type transistors as in a CMOS integrated circuit. The integration of CMOS devices with the semiconductor structure 10 of the present invention is possible because the doping level of that portion of epitaxial layer 14 containing the CMOS circuit block is suitable for the formation of p or n-wells and CMOS devices. In other words, the epitaxial layer does not need to be heavily-doped in the circuit block region.

After forming the transistor circuit block, those portions of refill oxide layer 32 over the movable portions of the sensor or microstructure are removed using a conventional sacrificial etching process. Specifically, this sacrificial etch removes refill oxide layer from, for example, the regions between members 20 and 22. Hydrofluoric acid (HF), for example, can be used to perform the sacrificial etch.

It should be noted that in other embodiments, the process sequence above could be changed. For example, cavity 40 could be formed after the formation of the transistor circuit block. In this case, refill oxide layer 32 would be removed from the sensor portion of the chip after forming the transistors so that cavity 40 could then be etched.

By now, it should be appreciated that there has been provided a novel semiconductor structure having a monocrystalline member overlying a cavity in a semiconductor substrate and a process therefor. Sensors formed according to the present invention have the advantages of reduced parasitic capacitance, improved mechanical properties, and higher signal-to-noise ratios.

Also, the present sensor is capable of high aspect ratio lateral structures that avoid the problems of stress seen in some prior polysilicon microstructures formed by low pressure chemical vapor deposition (the cracking for these prior structures becomes even more significant for thicker polysilicon depositions). Further, the present sensor is readily integrated with transistors on the same chip.

Monocrystalline microstructures as used in the sensor above have superior material properties relative to prior structures including low internal stress. The high etch selectivities achieved make possible the formation of uniformly repeatable structures. Moreover, the use of RIE to pattern sensor fingers and other components takes advantage of the benefits of conventional trench etching in silicon including uniform trench width and well-defined vertical sidewalls. Finally, for those process options above where the substrate is heavily doped, the substrate acts as a ground plane for the sensor and makes the sensor structure substantially insensitive to adverse oxide charging effects, which improves the sensor's radiation hardness.

Applications for the semiconductor structure and process of the present invention include use in accelerometers for front and side air bag deployment, chemical sensors, simultaneous x and y-axis sensing, and automotive ride control adjustment. For example, a chemical sensor can be formed with a microstructure cantilever that is coated with gold or a polymer that is sensitive to certain gas or liquid chemicals. When the cantilever is stressed due to the effects of the chemical being sensed, the stress can be measured optically or by a capacitance change.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A monolithic semiconductor sensor structure comprising:
    a semiconductor layer overlying a semiconductor substrate, wherein a portion of said semiconductor layer provides a monocrystalline member and another portion of said semiconductor layer extends from and cooperates with a portion of the semiconductor substrate so that the lattice structure of the semiconductor layer matches the lattice structure of the semiconductor substrate; and
    a cavity disposed under at least a portion of said member that exposes a bottom surface of said member, wherein said cavity has a cavity surface and a distance from said bottom surface to said cavity surface is greater than about 5 microns.

2. The semiconductor structure of claim 1 wherein said member has a height and a width and said height is at least twice said width.

3. The semiconductor structure of claim 1 wherein said semiconductor layer has an opposite conductivity type from said semiconductor substrate.